United States Patent

[11] 3,619,747

| [72] | Inventor | Daryl R. Pedersen<br>Wayzata, Minn. |
|---|---|---|
| [21] | Appl. No. | 3,640 |
| [22] | Filed | Jan. 19, 1970 |
| [45] | Patented | Nov. 9, 1971 |
| [73] | Assignee | Novatron, Inc.<br>St. Paul, Minn. |

[54] ELECTRONIC MOTOR CONTROL CIRCUIT EMPLOYING TRIACS
1 Claim, 1 Drawing Fig.

[52] U.S. Cl. .................................................. 318/202,
318/207, 318/227, 318/231
[51] Int. Cl. .................................................. H02p 3/20
[50] Field of Search .................................................. 318/202,
206, 207, 227, 231, 290, 297, 300

[56] References Cited
UNITED STATES PATENTS

| 3,421,063 | 1/1969 | Reinke | 318/207 |
| 3,500,151 | 3/1970 | Burk | 318/207 |

Primary Examiner—Oris L. Rader
Assistant Examiner—K. L. Crosson
Attorney—Burd, Braddock & Bartz ABSTRACT: A motor control circuit for controlling the direction of rotation of a reversible alternating current motor wherein a pair of symmetrical silicon negative resistance switches, commonly known as triacs, are used to control the excitation of such motor, the firing of the triacs, in turn, being controlled by the output of a transistor difference amplifier.

PATENTED NOV 9 1971
3,619,747
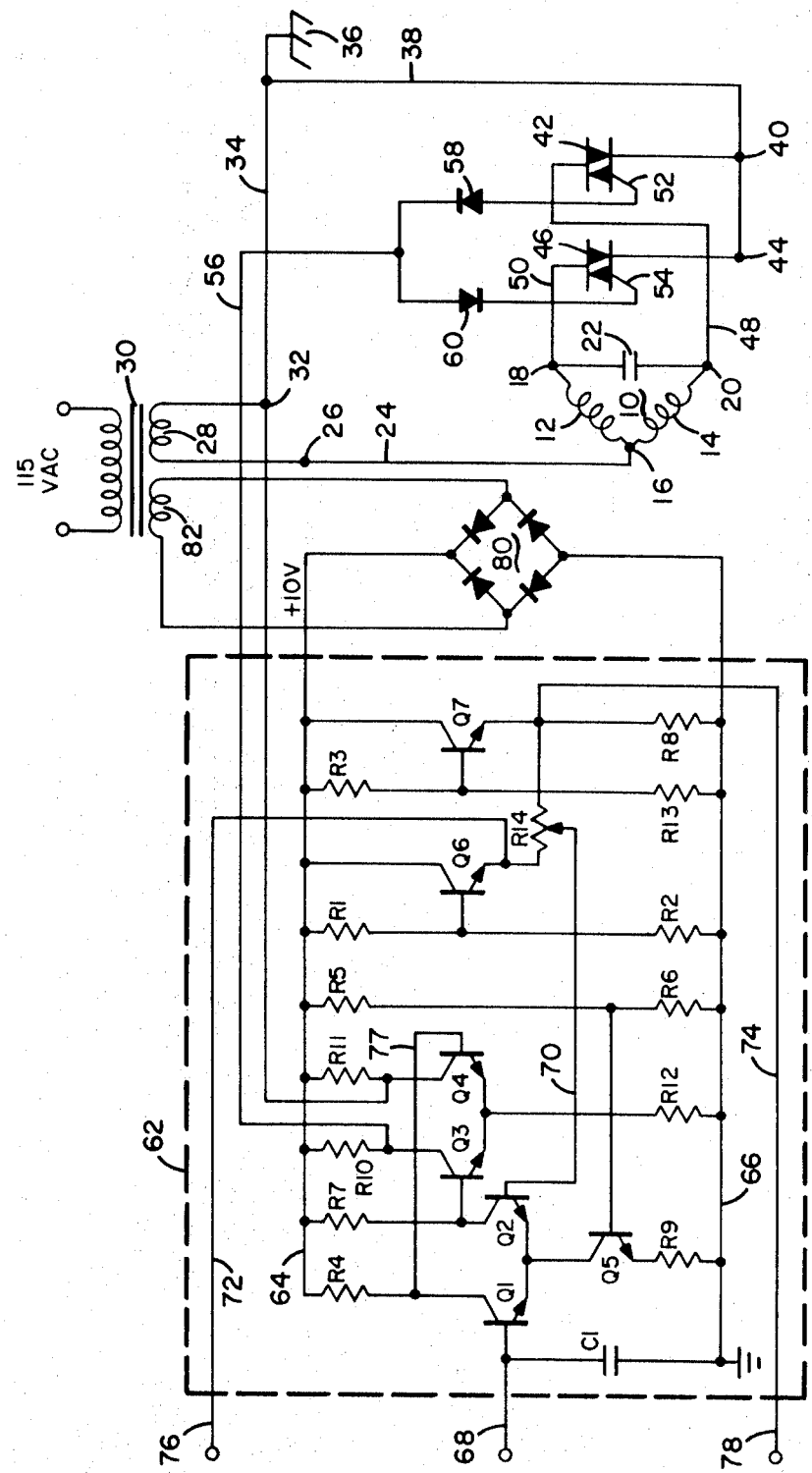
INVENTOR
DARYL R. PEDERSEN
BY Burd, Braddock & Bartz
ATTORNEYS

ELECTRONIC MOTOR CONTROL CIRCUIT EMPLOYING TRIACS

BACKGROUND OF THE INVENTION

The present invention provides an improved motor control circuit suitable for use in controlling the disposition of a drive motor, such as, for example, a damper-driving motor used in heating systems wherein it is desired to control the immediate positioning of a damper by controlling the extent and direction of rotation of an alternating current motor which is connected to drive the damper. In the past, electromechanical means have been employed to perform the requisite current-switching function. The performance of such prior art systems has not been altogether satisfactory due to problems of vibration resulting in contact bounce, low reliability, and positioning precision. The present invention replaces electromechanical switches with solid state electronic switches.

In the present invention, an input signal from a sensor is connected to one side of a difference amplifier, the other side of which is maintained at a suitable reference. The deviation of the input signal from the predetermined reference provides an output which functions as a control signal applied to the control electrodes of a pair of triac devices. The triacs are connected in series relation between a source of alternating current and the windings of a reversible alternating current motor. Depending upon the polarity of the control signal obtained from the difference amplifier, the capacitor incorporated in the reversible motor will be connected in series with one or the other of the two motor windings to thereby determine the direction of rotation of the rotor of the motor. From the foregoing, it can be seen that the control or gate signal for the triacs is independent of the phase relationship of the AC signal being controlled. This is oftentimes desirable in systems of the type described.

It is accordingly the principal object of this invention to provide a new and improved motor control circuit which employs solid state devices throughout.

Another object of the present invention is to provide an improved motor control circuit wherein the direction of rotation of the motor is determined by the preselected firing of one or the other of a pair of triacs, the preselected firing being obtained from the output of a transistor difference amplifier.

These and other objects of this invention will become apparent upon a review of the following specification, appended claims and accompanying drawing wherein the FIG. is a schematic drawing of the preferred embodiment of the invention.

Referring now to the drawing, there is shown a reversible direct current motor 10 which includes a pair of windings 12 and 14. One end of the windings 12 and 14 are connected in common at a junction 16. The other terminals 18 and 20 of the motor windings are coupled or connected together through a capacitor 22. The terminal 16 is connected by a conductor 24 to a first terminal 26 of a secondary winding 28 of a transformer 30. Transformer 30 is selected to supply power at the potential required for the motor and in the embodiment shown is preferably a stepdown transformer for converting 115-volt alternating current to a 24-volt alternating current supply. The other terminal 32 of secondary winding 28 is connected by means of a conductor 34 to a point of fixed potential such as ground 36. A conductor 38 connects the point of fixed potential (ground) 36 to a first terminal 40 of a first of a pair of symmetrical silicon negative resistance switches, such as triac 42 and to the first terminal 44 of a second triac 46. The other terminal of triac 42 is connected by way of conductor 48 to the motor winding terminal 20. Similarly, a conductor 50 connects the other terminal of triac 46 to the motor winding terminal 18. Thus, depending upon which of the two triacs 42 or 46 is conducting, the capacitor 22 will be connected either in series with the motor winding 12 or with the motor winding 14 between the alternating current source 28 and ground 36. Specifically, if it is assumed that triac 42 is conducting while triac 46 is nonconducting, then the motor winding 14 will be connected directly across the secondary winding of transformer 30 whereas winding 12 will be connected in series with the capacitor 22 across the secondary winding 28. Under these circumstances, for example, the motor will rotate in a clockwise direction. However, when triac 46 is conducting with triac 42 nonconducting, it will be winding 12 that is directly connected across the AC supply 28 and winding 14 will be connected in series with the capacitor 22 across the alternating current supply, and accordingly, the rotor will then rotate in the reverse or counterclockwise direction.

Which of the two triacs will be conducting at any particular time is dependent upon the polarity of the signal being applied to the triac gate electrodes 52 and 54. The control signal is applied to the gate electrodes by way of a conductor 56 and the oppositely poled semiconductor diodes 58 and 60.

The control circuit for developing the requisite control signal is shown in that portion of the schematic enclosed by dashed line 62. In its simplest form, it comprises a difference amplifier including the NPN transistors Q1 and Q2. These transistors are connected in a conventional fashion between a voltage supply bus 64 and a ground bus 66. Specifically, the collector electrodes of the transistors Q1 and Q2 are connected through resistors of equal value R4 and R7 to the voltage supply bus 64 which is preferably maintained at approximately 10-volts potential. The emitter electrodes of transistors Q1 and Q2 are connected together and are coupled through the collector to emitter path of a transistor 25 and a resistor R9 to the ground bus 66. Transistor Q1 receives an input signal of a polarity dependent upon the condition being sensed from a suitable sensor (not shown) by way of a conductor 68 connected to the base or control electrode of transistor Q1. The control electrode of transistor Q2 is connected by way of a conductor 70 to the wiper terminal of a potentiometer R14. The outer terminals of potentiometer R14 are connected by way of conductors 72 and 74 to a reference supply source (not shown) which is adapted to be coupled across terminals 76 and 78. Transistor Q5 is normally biased so as to be operating on a linear portion of its characteristic curve. The bias for the transistor Q5 is obtained by way of the voltage divider including the resistors R5 and R6.

The output from the difference amplifier obtained at the collector electrode of the transistor Q2 is applied as a control signal to the base electrode of an NPN transistor Q3. Transistor Q3 serves to amplify the difference signal obtained from the difference amplifier and applies this signal to the control conductor 56 mentioned previously. Transistor Q4 has its emitter electrode connected in common with the emitter electrode of transistor Q3 while its base electrode is connected by way of a conductor 77 to the collector electrode of transistor Q1 of the difference amplifier.

The desired bias potential for the control circuits enclosed by dashed line 62 is obtained from the full-wave rectifier bridge circuit 80 which, in turn, is energized by secondary winding 82 on transformer 30.

OPERATION

Attention is now directed to the mode of operation. When the primary winding of the transformer 30 is connected to a suitable alternating current voltage source, the voltage will be altered by means of the transformer 30 such that a desired stepped down potential will be applied across opposing terminals of the diode-rectifier bridge network 80. This causes a direct current voltage to appear on the voltage supply bus 64, this voltage being with respect to the ground bus 66. The system is initially balanced by way of the wiper on the potentiometer R14 such that equal currents flow through the emitter to collector paths of the transistors Q1 and Q2 of the difference amplifier. As a result, there will be no difference in the voltage applied to the control electrodes of transistors Q3 and Q4 and no control signal will be present on the conductor 56 which is coupled to the gate electrode 52 and 54 of the triacs 42 and 46. Hence, neither one of these triacs will be conductive and hence, no current will flow through the motor windings 12 and 14. As a result, the rotor of the motor will be stationary.

If it is assumed that the sensor connected to the input line 68 causes a difference voltage to be applied to the base of the transistor Q1, the normal equilibrium condition will be unbalanced. The direction of rotation of the motor which results will depend upon the polarity of the input signal provided by the sensor. For example, if it is assumed that the sensor applies a more positive signal to the base of transistor Q1, it will be made to conduct more heavily such that the signal appearing on the conductor 76 will be more negative than the signal appearing at the collector electrode of the transistor Q2. As a result, transistor Q4 will be rendered less conductive while transistor Q3 carries a higher current. Under this assumed condition, the potential appearing at the collector of transistor Q3 will drop and a more negative signal will appear on the control conductor 56. This signal is coupled by way of the diode 60 to the gate electrode 54 of triac 46. This causes the triac 46 to be switched on and permits a bidirectional current to flow from the secondary winding 28 of the transformer 30 through the winding 12, through conductor 50 and through conductors 44 and 38 to ground 36. As mentioned previously, this will result in a counterclockwise rotation of the motor.

If it were initially assumed that the sensor connected to the input line 68 causes the signal applied to the control electrode of transistor Q1 to become more negative, just the opposite result will occur. Specifically, the negative signal applied to the base electrode of transistor Q1 will render it less conductive than transistor Q2. As a result, the signal applied to the base electrode of transistor Q3 will become more negative thus tending to limit the current flow through the resistor R10. With a smaller drop across R10, a more positive potential will be applied by way of conductor 56 and diode 58 to the gate electrode 52 of triac 42. As a result, triac 42 will be rendered conductive. The motor winding 14 will thus be connected directly across the secondary winding 28 of transformer 30. At the same time, motor winding 12 and capacitor 22 will be connected in series across the secondary of transformer 30. This results in a clockwise rotation of the motor shaft.

The circuit forming the preferred embodiment of the invention may have many applications in a motor control environment. The circuit has been found to be especially suited to a heating control wherein the motor is used to position a damper in the heating system, and it is appreciated that a variety of other applications exist as well. The invention as above described can be seen to be a comparatively inexpensive and reliable arrangement for providing power to a motor load through the use of solid state switching devices.

By way of reference, the values of the components disclosed in the drawing are as follows:

$R_1$—330 ohms
$R_2$—680 ohms
$R_3$—330 ohms
$R_4$—560 ohms
$R_5$—10,000 ohms
$R_6$—2,700 ohms
$R_7$—560 ohms
$R_8$—100 ohms
$R_9$—120 ohms
$R_{10}$—1,000 ohms
$R_{11}$—1,000 ohms
$R_{12}$—560 ohms
$R_{13}$—180 ohms
$C_1$—0.1 microfarad
$C_{22}$—two series coupled (opposed polarity) 100 microfarad electrolytic.
$Q_1$—Type 2N4123
$Q_2$—Type 2N4123
$Q_3$—Type 2N4123
$Q_4$—Type 2N4123
$Q_5$—Type 2N4123
$Q_6$—Type 2N4123
$Q_7$—Type 2N4123
CR1–CR4—Type GE-Type A14F
CR5–CR6—Type 1N4454
Triac 42 & 46 —Type RCA 40525

It will be appreciated that components with values other than those above could be substituted in a modified circuit and used with different voltages and currents.

I claim:

1. A circuit for an electric motor for continuously controlling the direction and extent of rotation of its output shaft comprising in combination:
   a. A source of alternating current voltage having first and second terminals;
   b. A split-phase induction motor having a pair of windings, each with first and second terminals, the first terminal of each of said windings connected to said first terminal of said source and the second terminals of said pair of windings being connected together with a capacitor;
   c. First and second bidirectional gated semiconductor current switch devices each having a pair of output electrodes and a gate electrode;
   d. Means connecting said pair of output electrodes of said first and second current switch devices, respectively, between said second terminal of said source and said second terminals of said pair of winding;
   e. A full-wave rectifier coupled to said source of alternating current voltage for providing a source of direct current;
   f. Differential amplifier means including a pair of NPN transistors, each having an emitter electrode, a collector electrode and a base electrode, the emitter electrodes of said pair of electrodes being connected to each other and coupled to one terminal of said source of direct current and the collector electrodes being coupled to a second terminal of said source of direct current;
   g. Means including a pair of oppositely poled semiconductor diodes coupling said gate electrodes of said first and second bidirectional gated semiconductor current switch devices to the collector electrode of one of said pair of NPN transistors; and
   h. Means for applying a control voltage signal of predetermined polarity to the base electrode of one of said pair of NPN transistors and a predetermined reference voltage signal to the base electrode of the other of said pair of NPN transistors, the arrangement being such that a gating signal is developed for switching on the first of said gated current switch devices when said control voltage signal is of a first polarity with respect to said reference voltage signal and for switching on the second of said current switch devices when said control voltage is of a second polarity with respect to said reference voltage.

* * * * *